(12) United States Patent
Maxwell et al.

(10) Patent No.: US 8,669,199 B2
(45) Date of Patent: Mar. 11, 2014

(54) CORDIERITE-FORMING BATCH MATERIALS AND METHODS OF USING THE SAME

(75) Inventors: Chris Maxwell, Painted Post, NY (US); Martin Joseph Murtagh, Trumansburg, NY (US)

(73) Assignee: Corning Incorporated, Corning, NY (US)

( * ) Notice: Subject to any disclaimer, the term of this patent is extended or adjusted under 35 U.S.C. 154(b) by 152 days.

(21) Appl. No.: 13/375,706

(22) PCT Filed: Jun. 5, 2009

(86) PCT No.: PCT/US2009/003419
§ 371 (c)(1),
(2), (4) Date: Dec. 1, 2011

(87) PCT Pub. No.: WO2010/141000
PCT Pub. Date: Dec. 9, 2010

(65) Prior Publication Data

US 2012/0071315 A1 Mar. 22, 2012

(51) Int. Cl.
*C04B 35/03* (2006.01)
*C04B 35/00* (2006.01)
*C04B 33/24* (2006.01)

(52) U.S. Cl.
USPC ............ 501/119; 501/144; 501/122; 501/129

(58) Field of Classification Search
USPC ......... 501/108, 118, 119, 121, 122, 127, 128, 501/129, 130, 131, 141, 144, 153, 154
See application file for complete search history.

(56) References Cited

U.S. PATENT DOCUMENTS

| 2,864,919 | A | * | 12/1958 | Stringfellow | ................. 218/150 |
| 3,967,971 | A | * | 7/1976 | Eppler | ................. 501/9 |
| 5,938,992 | A | | 8/1999 | Hamanaka et al. | ............. 264/43 |
| 6,004,501 | A | | 12/1999 | Cornelius et al. | ............. 264/631 |

(Continued)

FOREIGN PATENT DOCUMENTS

| EP | 0899248 A1 | 8/1998 | ............ C04B 35/195 |
| JP | 1999079831 | 3/1999 | |
| JP | 2006516528 | 7/2006 | |
| WO | 2006017676 | 2/2006 | ................ B28B 1/00 |

OTHER PUBLICATIONS

Ormsby et al. Surface Area and Exchange Capacity Relation in a Florida Kaolinite. Journal of the American Ceramic Society, vol. 43, Issue 1, p. 44-47, Jan. 1960.*

*Primary Examiner* — Noah Wiese
(74) *Attorney, Agent, or Firm* — Charles A. Greene; Matthew J. Mason

(57) ABSTRACT

The present disclosure relates to cordierite-forming batch materials and methods of using the same, and in particular batch materials for forming porous cordierite bodies suitable for treating engine emissions. The batch materials include sources of magnesium, alumina, silica, and high BET specific surface area raw kaolin clay. In some embodiments, the BET specific surface area of the raw kaolin clay is greater than 22 $m^2/g$. In other embodiments, the BET specific surface area of the raw kaolin clay is greater than 13 $m^2/g$, and the source of magnesium oxide and the source of non-kaolin clay source of silica both have relatively coarse particle size.

22 Claims, 3 Drawing Sheets

(56) References Cited

U.S. PATENT DOCUMENTS

| | | | |
|---|---|---|---|
| 7,485,170 B2 | 2/2009 | Beall et al. | 55/523 |
| 7,520,911 B2 | 4/2009 | Beall et al. | 55/523 |
| 2004/0148916 A1* | 8/2004 | Merkel | 55/523 |
| 2005/0242455 A1 | 11/2005 | Toda et al. | 264/44 |
| 2006/0017676 A1 | 1/2006 | Bowers et al. | 345/87 |
| 2008/0047243 A1 | 2/2008 | Beall et al. | 55/523 |

* cited by examiner

CORDIERITE-FORMING BATCH MATERIALS AND METHODS OF USING THE SAME

FIELD OF THE DISCLOSURE

The present disclosure relates to cordierite-forming batch materials and methods of using the same, and in particular batch materials for forming porous cordierite bodies suitable for treating engine emissions.

BACKGROUND

Cordierite-containing ceramic bodies may be used as catalyst substrates or as sorbents/filters for the capture of particulate, liquid, or gaseous species from fluids, such as gas streams and liquid streams, including, for example, diesel filter applications.

The inventors have now discovered additional cordierite-forming batch materials comprising at least one raw kaolin clay, and methods of using the batch materials disclosed herein.

SUMMARY

In accordance with the detailed description and various exemplary embodiments described herein, the present disclosure relates to cordierite-forming batch materials and methods of using the same. In various embodiments, the present disclosure relates to cordierite-forming batch materials comprising sources of magnesium, alumina, silica, and high BET specific surface area raw kaolin clay. The disclosure also relates to methods of making cordierite-containing ceramic bodies using the presently disclosed batch materials. In some embodiments, the cordierite-forming batch materials, and methods of making cordierite-containing ceramic bodies using such materials, disclosed herein comprise BET specific surface area raw kaolin clay of greater than 22 $m^2/g$. In other embodiments, the cordierite-forming batch materials, and methods of making cordierite-containing ceramic bodies using such materials, disclosed herein comprise BET specific surface area raw kaolin clay of greater than 13 $m^2/g$, relatively coarse particles of a source of magnesium oxide (having a median particle diameter greater than 10 μm), and relatively coarse particles of a source of non-kaolin clay source of silica (having a median particle diameter greater than 10 μm).

BRIEF DESCRIPTION OF THE DRAWINGS

The accompanying drawings are included to provide a further understanding of the invention, and are incorporated in and constitute a part of this specification. The drawings are not intended to be restrictive of the invention as claimed, but rather are provided to illustrate embodiments of the invention and, together with the description, serve to explain the principles of the invention.

DETAILED DESCRIPTION

Figure 1:
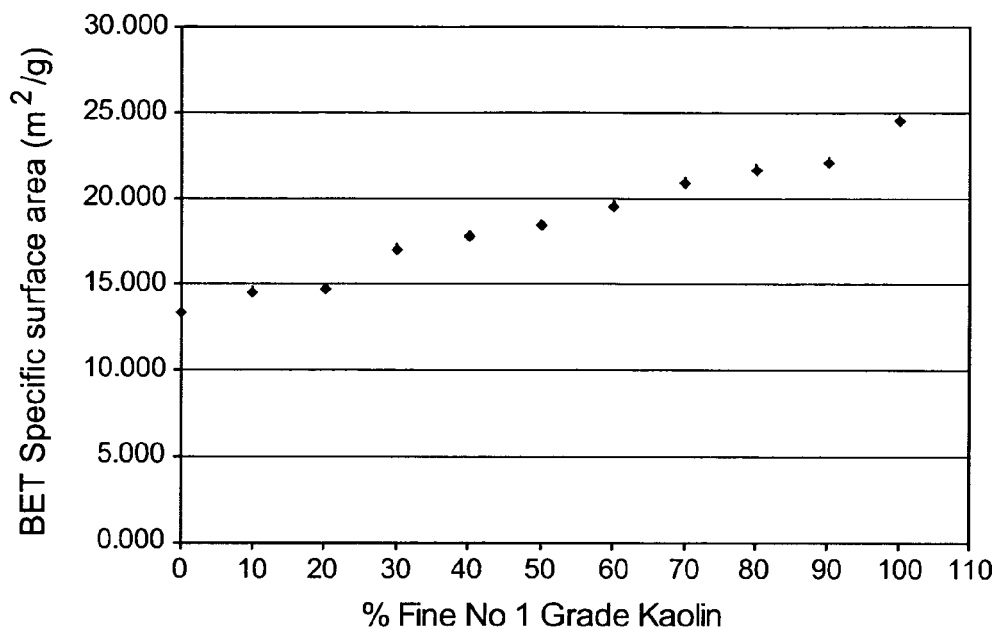
FIG. 1 is a graphical representation of the measured specific surface area of eleven blends of two grades of raw kaolin clay as set forth in Example 1.

It is to be understood that both the foregoing general description and the following detailed description are exemplary and explanatory only, and are not restrictive of the invention, as claimed. Other embodiments of the invention will be apparent to those skilled in the art from consideration of the specification and practice of the invention disclosed herein.

Cordierite is made from inorganic batch components such as magnesium, alumina, and silica sources, which may dictate compositional stoichiometry. These batch compositions may further comprise organic and/or inorganic binder materials. When organic binder materials are used, they may be removed at a low temperature (typically <400° C.) during the firing of the ceramic article. The present disclosure relates to cordierite-forming batch materials comprising inorganic batch components comprising at least one magnesium source, at least one alumina source, at least one silica source, and at least one raw kaolin clay. In some embodiments, the cordierite-forming batch materials, and methods of making cordierite-containing ceramic bodies using such materials, disclosed herein comprise BET specific surface area raw kaolin clay of greater than 22 $m^2/g$; we have found that such very high BET specific surface area raw kaolin clay can be used in a batch comprising inorganics with relatively fine particle size and may be used to obtain improved intermediate firing strength. In other embodiments, the cordierite-forming batch materials, and methods of making cordierite-containing ceramic bodies using such materials, disclosed herein comprise BET specific surface area raw kaolin clay of greater than 13 $m^2/g$, relatively coarse particles of a source of magnesium oxide (having a median particle diameter greater than 10 μm), and relatively coarse particles of a source of non-kaolin clay source of silica (having a median particle diameter greater than 10 μm); thus we have found that coarse particle size sources of magnesium oxide and non-kaolin clay source of silica can be effectively used with raw kaolin clay of having BET specific surface area greater than 13 $m^2/g$.

In various embodiments, the cordierite-forming batch material has an overall composition comprising, in weight percent on an oxide basis, 5-25% MgO, 35-60 wt % $SiO_2$, and 25-50 wt % $Al_2O_3$. In further embodiments, the at least one alumina source and at least one silica source are not kaolin clays. In yet further exemplary embodiments, kaolin clays, raw and calcined, may comprise less than 30 wt %, for example, less than 20 wt %, of the inorganic batch components.

The disclosure further relates to methods for making cordierite-containing ceramic bodies, comprising, in part, preparing the cordierite-forming batch materials of the present disclosure and preparing ceramic bodies from those batch materials.

As used herein, the term "batch material," and variations thereof, is intended to mean a substantially homogeneous mixture comprising inorganic batch components. The batch material of the present disclosure may be used to make cordierite-containing ceramic bodies, i.e., may be "cordierite-forming batch material." In various exemplary embodiments of the present disclosure, inorganic batch components comprising the batch material may be chosen from at least one source of magnesium, at least one source of alumina, at least one source of silica, and at least one raw kaolin clay.

Sources of magnesium include, but are not limited to, magnesium oxide or other materials having low water solubility that when fired convert to MgO, such as $Mg(OH)_2$, $MgCO_3$, and combinations thereof. For example, the source of magnesium may be talc ($Mg_3Si_4O_{10}(OH)_2$), including calcined and uncalcined talc, and coarse and fine talc.

In various exemplary embodiments, one of skill in the art may choose the at least one magnesium source so that the median particle diameter of the at least one magnesium source may be greater than 1 μm, greater than 5 μm, or greater than 10 μm, such as for example ranging from 1 μm to 40 μm, from 5 to 25 μm, or from 10 to 15 μm.

In various exemplary embodiments, the at least one magnesium source may be present in an amount such that it may comprise from 5 to 25 wt % of the overall cordierite-forming batch material on an oxide basis, for example from 10 to 20 wt % of the cordierite-forming batch material on an oxide basis, such as, for example, 14 wt %.

Sources of alumina include, but are not limited to, powders that when heated to a sufficiently high temperature in the absence of other raw materials, will yield substantially pure aluminum oxide. Examples of such alumina sources include alpha-alumina, a transition alumina such as gamma-alumina or rho-alumina, hydrated alumina, gibbsite, corundum ($Al_2O_3$), boehmite (AlO(OH)), pseudoboehmite, aluminum hydroxide ($Al(OH)_3$), aluminum oxyhydroxide, and mixtures thereof. In at least one embodiment, the at least one alumina source is a kaolin clay, and in at least one further embodiment, the at least one alumina source is not a kaolin clay.

In various exemplary embodiments, one of skill in the art may choose the at least one alumina source so that the median particle diameter of the at least one alumina source may be greater than 1 μm, such as for example, ranging from 1 μm to 10 μm.

In various exemplary embodiments, the at least one alumina source may be present in an amount such that it may comprise from 25 to 50 wt % of the overall cordierite-forming batch material on an oxide basis, for example from 30 to 45 wt % of the cordierite-forming batch material on an oxide basis, such as, for example, 35 wt %.

Sources of silica include, but are not limited to, non-crystalline silica, such as fused silica or sol-gel silica, silicone resin, low-alumina substantially alkali-free zeolite, diatomaceous silica, kaolin, and crystalline silica, such as quartz or cristobalite. Additionally, the sources of silica may include silica-forming sources that comprise a compound that forms free silica when heated, for example, silicic acid or a silicon organometallic compound. In at least one embodiment, the at least one silica source is not a kaolin clay.

In various exemplary embodiments, one of skill in the art may choose the at least one silica source so that the median particle diameter of the at least one silica source may be greater than 3 μm, greater than 6 μm, or greater than 10 μm, such as, for example ranging from 3 μm to 40 μm, from 6 μm to 35 μm, or from 10 μm to 25 μm.

In various exemplary embodiments, the at least one silica source may be present in an amount such that it may comprise from 35 to 60 wt % of the overall cordierite-forming batch material on an oxide basis, for example from 40 to 55 wt % of the cordierite-forming batch material on an oxide basis, such as, for example 51 wt %.

Raw kaolin clays of the present disclosure include, but are not limited to laminated and delaminated kaolins. In various exemplary embodiments, the inorganic batch components may further comprise calcined kaolin clay, laminated or delaminated. For example, in at least one embodiment, the inorganic batch components may comprise a blend of at least one raw kaolin clay and at least one calcined kaolin clay.

In various exemplary embodiments, at least one raw kaolin clay can be selected with a BET surface area of the at least one raw kaolin clay is greater than 13 $m^2/g$, for example greater than 22 $m^2/g$.

In various exemplary embodiments of the present disclosure, the at least one raw kaolin clay may be chosen from commercially available products, such as that sold as Fine No. 1 under the trade name of Kaofine 90™ marketed by Thiele Kaolin Company (Sandersville, Ga.).

In various exemplary embodiments, the total amount of kaolin clay, including raw and calcined kaolin clays, when present, may comprise less than 30 wt % of the inorganic batch components comprising the cordierite-forming batch material. For example, the total amount of kaolin clay may comprise less than 20 wt % or less than 15 wt % of the inorganic batch components comprising the cordierite-forming batch material, such as, for example 12 wt % of the inorganic batch components comprising the cordierite-forming batch material.

In various embodiments of the present disclosure, the inorganic batch components may be selected such that the stoichiometry of the batch material has an overall composition comprising, in weight percent on an oxide basis, 35-60 wt % $SiO_2$, 25-50 wt % $Al_2O_3$, and 5-25% MgO, such as, for example, 46-53 wt % $SiO_2$, 33-41 wt % $Al_2O_3$, and 11-17 wt % MgO.

In various embodiments of the present disclosure, the cordierite-forming batch material has an overall composition effective to yield, upon firing, a cordierite ceramic wherein the cordierite phase comprises at least 90% by weight of the ceramic.

In various embodiments of the present disclosure, the batch material may further comprise at least one additional component. For example, in various embodiments, the at least one additional component may be chosen from pore-forming materials, organic binders, and lubricants.

As used herein, the term "pore-forming material," and variations thereof, means materials selected from the group of: carbon (e.g., graphite, activated carbon, petroleum coke, and carbon black), starch (e.g., corn, barley, bean, potato, rice, tapioca, pea, sago palm, wheat, canna, and walnut shell flour), and polymers (e.g., polybutylene, polymethylpentene, polyethylene (preferably beads), polypropylene (preferably beads), polystyrene, polyamides (nylons), epoxies, ABS, Acrylics, and polyesters (PET)). In at least one embodiment, the at least one pore-forming material is chosen from starches.

In various exemplary embodiments, the batch material is comprised of at least one pore-forming material; in further embodiments, the batch material is comprised of at least two pore-forming materials, such as at least three pore-forming materials. For example, a combination of a polymer and graphite may be used, or a combination of starch and graphite, or a combination of a polymer and a starch.

In various embodiments of the present disclosure, the batch material may further comprise at least one organic binder. In such an embodiment, it is within the ability of one skilled in the art to select an appropriate binder. By way of example only, an organic binder may be chosen from cellulose-containing components, for example, methylcellulose, methylcellulose derivatives, and combinations thereof.

It is also within the ability of one skilled in the art to select an appropriate solvent, if desired. In various exemplary embodiments, the solvent may be water, for example deionized water.

In additional exemplary embodiments, batch material may be mixed with any other known component useful for making batch material, such as, for example, at least one lubricant.

The batch material may be made by any method known to those of skill in the art. By way of example, in at least one embodiment, the inorganic batch components may be combined as powdered materials and intimately mixed to form a substantially homogeneous mixture.

Additional optional components, such as at least one organic binder and/or pore-former and/or solvent may be mixed with the inorganic batch components individually, in any order, or together to form a substantially homogeneous mixture. It is within the ability of one of skill in the art to determine the appropriate steps and conditions for combing the inorganic batch components and optional components to achieve a substantially homogeneous batch material and to determine the appropriate mixing conditions to achieve a substantially homogeneous material. For example, the components may be mixed by a kneading process to form a substantially homogeneous mixture.

The mixture may, in various embodiments, be shaped into a ceramic body by any process known to those of skill in the art. By way of example, the mixture may be injection molded or extruded and optionally dried by conventional methods known to those of skill in the art to form a green body.

In various exemplary embodiments, the green body may then be fired to form a cordierite-containing ceramic body. In various embodiments, firing the green body may comprise at least two stages, e.g., removal of at least one organic binder and sintering.

It is within the ability of one skilled in the art to determine the appropriate method and conditions for forming a ceramic body, such as, for example, firing conditions including equipment, temperature and duration, to achieve a cordierite-containing ceramic body, depending in part upon the size and composition of the green body.

The cordierite-containing ceramic bodies made in accordance with the present disclosure may have any useful size and shape, including for example, cellular bodies, such as honeycomb bodies.

In at least one embodiment of the present disclosure, the batch materials, including the amount, particle size, and particle size distribution of the at least one raw kaolin clay, may be selected to improve the intermediate firing strength of the intermediate-fired cordierite-forming bodies.

As used herein, the term "intermediate firing strength," and variations thereof, refers to the strength of a ceramic body during firing in the range of 400° C. to 1000° C., also referred to herein as an "intermediate-fired" cordierite-forming body. In at least one embodiment of the present disclosure, for example, it may be the strength of a ceramic body after removal of at least one organic binder and prior to sintering. It is within the ability of one skilled in the art to determine appropriate methods and conditions for measuring the strength of an intermediate-fired cordierite-forming body. For example, in one embodiment, strength of the intermediate-fired cordierite-forming body may be measured using an MTS Alliance RT5 4-point flex MOR unit with a 2.5 inch support span and 0.75 inch load span.

As used herein, the term "improve the intermediate firing strength," and variations thereof, is intended to mean an increase in the strength of an intermediate-fired cordierite-forming body relative to that of intermediate-fired cordierite-forming bodies not made from cordierite-forming batch materials that include high BET specific surface area raw kaolin clay as described in the present disclosure. In various embodiments, the intermediate firing strength of cordierite-forming bodies may increase by at least 10%, for example at least 20%, at least 40%, at least 60%, at least 80%, at least 100%, or greater.

In various embodiments of the present disclosure, the stress developed in intermediate-fired cordierite-forming bodies may be reduced relative to that of intermediate-fired cordierite-forming bodies not made from cordierite-forming batch materials that include high BET specific surface area raw kaolin clay as described in the present disclosure. For example, in at least one embodiment, the stress in an intermediate-fired cordierite-forming body due to internal and external thermal gradients may be reduced relative to that of intermediate-fired cordierite-forming bodies not made from cordierite-forming batch materials as described in the present disclosure.

In various embodiments of the present disclosure, the cordierite-containing ceramic bodies made in accordance with the present disclosure may be used as catalytic substrates and diesel filters.

Unless otherwise indicated, all numbers used in the specification and claims are to be understood as being modified in all instances by the term "about," whether or not so stated. It should also be understood that the precise numerical values used in the specification and claims form additional embodiments of the disclosure. Efforts have been made to ensure the accuracy of the numerical values disclosed in the Examples. Any measured numerical value, however, can inherently contain certain errors resulting from the standard deviation found in its respective measuring technique.

As used herein the use of "the," "a," or "an" means "at least one," and should not be limited to "only one" unless explicitly indicated to the contrary. Thus, for example, the use of "the batch material" or "a batch material" is intended to mean at least one batch material.

Other embodiments of the disclosure will be apparent to those skilled in the art from consideration of the specification and practice of the invention disclosed herein. It is intended that the specification and examples be considered as exemplary only, with a true scope and spirit of the invention being indicated by the claims.

EXAMPLES

The following examples are not intended to be limiting of the invention as claimed.

Example 1

Eleven blends of raw kaolin clays were prepared using varying amounts of a No. 2 delaminated processed kaolin clay and a Fine No. 1 kaolin clay. Eighty wt % of the No. 2 kaolin clay particles are of a diameter less than 2 μm, and the clay has a BET specific surface area of 13.4 m$^2$/g. The Fine No. 1 kaolin clay has a BET specific surface area of 24.6 m$^2$/g.

The No. 2 kaolin clay was blended in 10% increments with the Fine No. 1 kaolin clay as set forth in Table 1 below. The BET specific surface areas of the end members and blends were measured and are set forth in Table 1 below and in FIG. 1.

TABLE 1

BET Specific Surface Areas of End Members and Blends

| | Wt % No. 2 Kaolin Clay | | | | | | | | | | |
|---|---|---|---|---|---|---|---|---|---|---|---|
| | 100 | 90 | 80 | 70 | 60 | 50 | 40 | 30 | 20 | 10 | 0 |
| Wt % Fine No. 1 Kaolin Clay | 0 | 10 | 20 | 30 | 40 | 50 | 60 | 70 | 80 | 90 | 100 |
| BET Specific Surface Area ($m^2/g$) | 13.4 | 14.2 | 14.8 | 17.1 | 17.9 | 18.5 | 19.6 | 21.0 | 21.7 | 22.2 | 24.6 |

Example 2

Batch material consisting of talc, alumina, silica, pore former, lubricant, organic binder, and No. 2 kaolin clay with a BET specific surface area of 13.4 $m^2/g$ (as in Example 1 above) was prepared. The cordierite-forming batch materials are set forth in Table 2 below.

TABLE 2

Cordierite-Forming Batch Materials

| Batch Components | Approximate median spherical diameter (μm)* | wt (%) |
|---|---|---|
| Talc | 15 | 41.0 |
| Kaolin | 0.8 | 12.0 |
| α-Alumina | 4 | 15.0 |
| Hydrated Alumina | 4 | 19.0 |
| Silica | 20 | 13.0 |

*Measured by sedimentation

The batch material was kneaded with water to make an extrudable batch and then extruded through a ¼ inch diameter open-hole die, cut into 12 inch lengths, and dried. The dried ware (rod) was cut into 3 inch lengths and fired. The firing schedule was 1° C./min ramp to 700° C., 20 minute hold at 700° C., and 1° C./min cool to room temperature.

Figure 2:
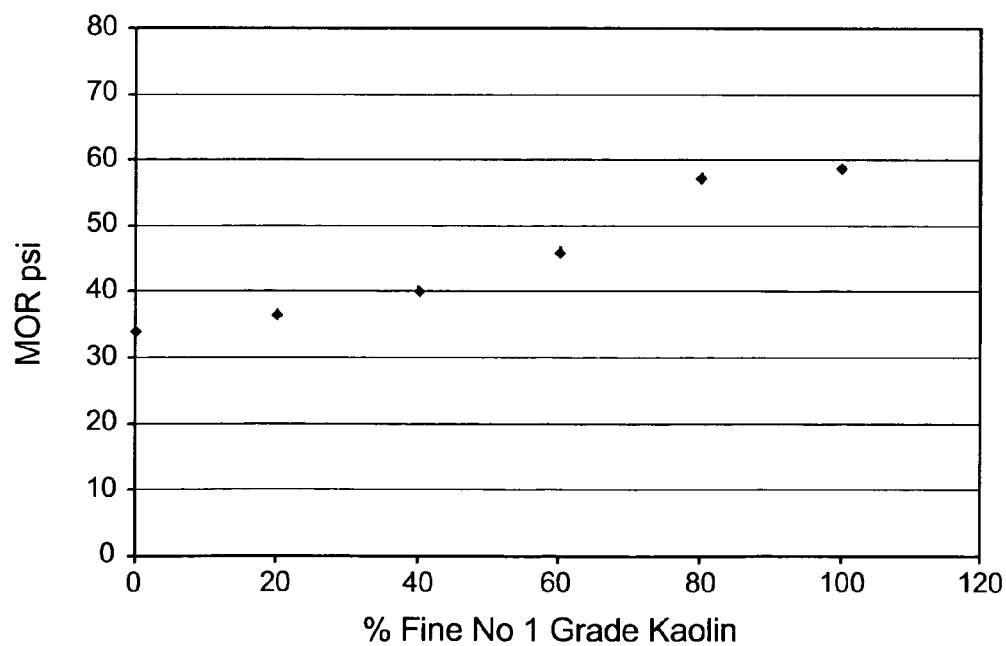
FIG. 2 is a graphical representation of the modulus of rupture (MOR) of the intermediate-fired cordierite-forming bodies described in Examples 2-7.
Figure 3:
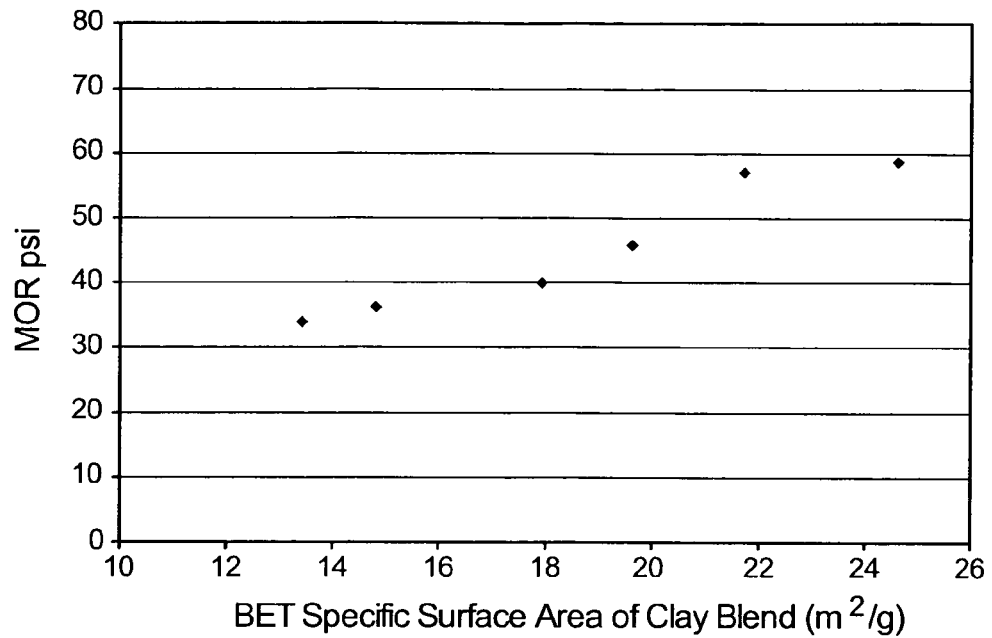
FIG. 3 is a graphical representation of the MOR of the intermediate-fired cordierite-forming bodies of Examples 2-7 as a function of the measured specific surface area of the kaolin clay blends used to make the bodies.

The intermediate-fired cordierite-forming body was strength tested using MTS Alliance RT5 4-point flex MOR unit with 2.5 inch support span and 0.75 inch load span. Ten sample rods were broken and the average MOR is shown in Table 3 below, and FIGS. 2 and 3 represent the average MOR as a function of the raw kaolin clay and BET specific surface area of the raw kaolin clay, respectively.

Examples 3-7

Examples 3-7 followed the procedure of Example 2 with the exception of the composition of the raw kaolin clay. Instead, blends of Fine No. 1 and No. 2 kaolin clays, as described in Example 1, were used, with the blends made at 20% increments as set forth in Table 3 below.

All samples were strength tested as described in Example 2. Ten sample rods for each composition were broken and the average MOR is shown in Table 3 below. Additionally, FIGS. 2 and 3 represent the average MOR for each composition as a function of the raw kaolin clay blend and BET specific surface area of the raw kaolin clay blend, respectively.

TABLE 3

700° C. Fired Strength of Extruded Rods

| Example | 2 | 3 | 4 | 5 | 6 | 7 |
|---|---|---|---|---|---|---|
| Wt % No. 2 Kaolin Clay | 100 | 80 | 60 | 40 | 20 | 0 |
| Wt % Fine No. 1 Kaolin Clay | 0 | 20 | 40 | 60 | 80 | 100 |
| BET Specific Surface Area ($m^2/g$) | 13.4 | 14.8 | 17.9 | 19.6 | 21.7 | 24.6 |
| 700° C. Extruded Rod Strength (psi) | 33.96 | 36.34 | 40.02 | 45.97 | 57.18 | 58.70 |

Example 8

Batch material consisting of talc, alumina, silica, pore former, lubricant, organic binder, and No. 2 kaolin clay with a BET specific surface area of 13.4 $m^2/g$ (as in Example 1 above) was prepared. The composition of the batch is set forth in Table 2 above.

The batch material was kneaded with water to make an extrudable batch and then extruded through a 200/12 honeycomb die, cut into 12 inch lengths, and dried. The ware is fired to make a cordierite-containing ceramic body.

Figure 4:
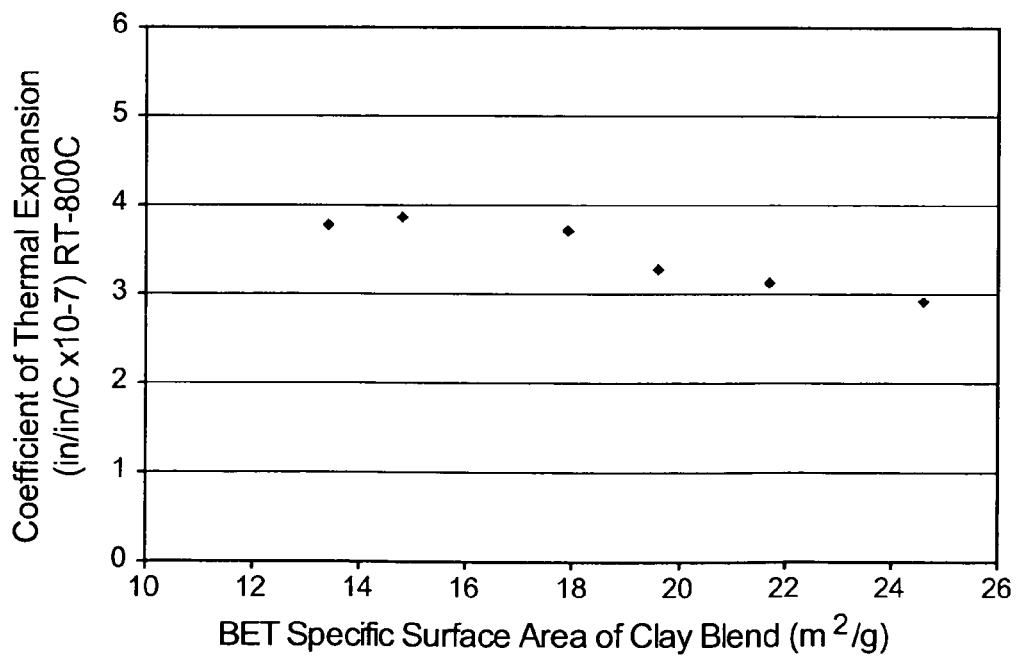
FIG. 4 is a graphical representation of the coefficient of thermal expansion of the cordierite-containing ceramic bodies described in Examples 8-13 as a function of the measured specific surface area of the kaolin clay blends used to make the bodies.
Figure 5:
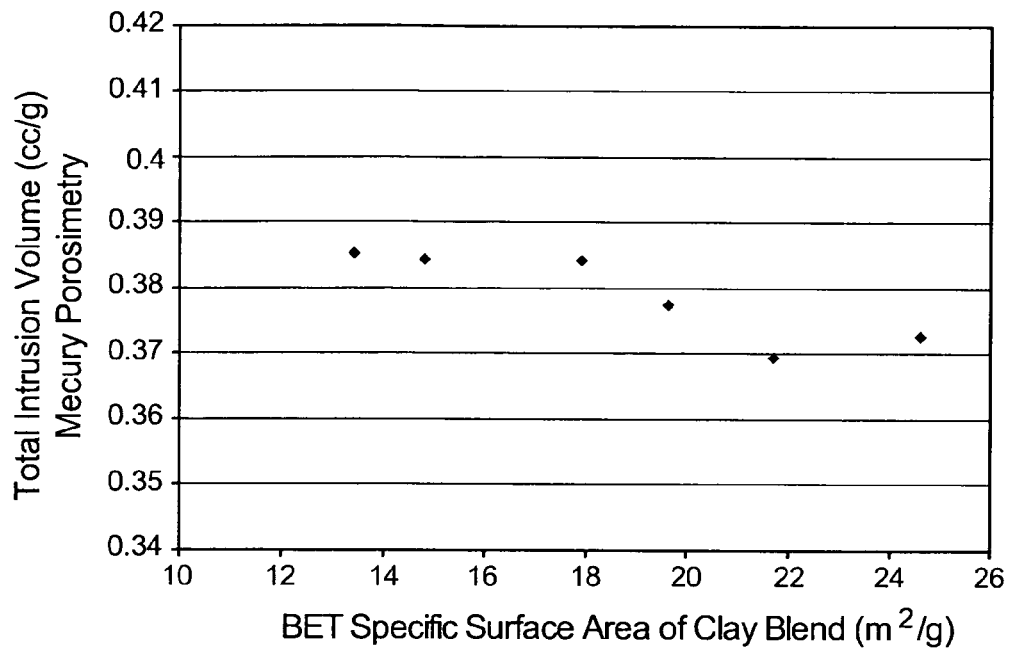
FIG. 5 is a graphical representation of the total porosity of the cordierite-containing ceramic bodies described in Examples 8-13 as a function of the measured specific surface area of the kaolin clay blends used to make the bodies.
Figure 6:
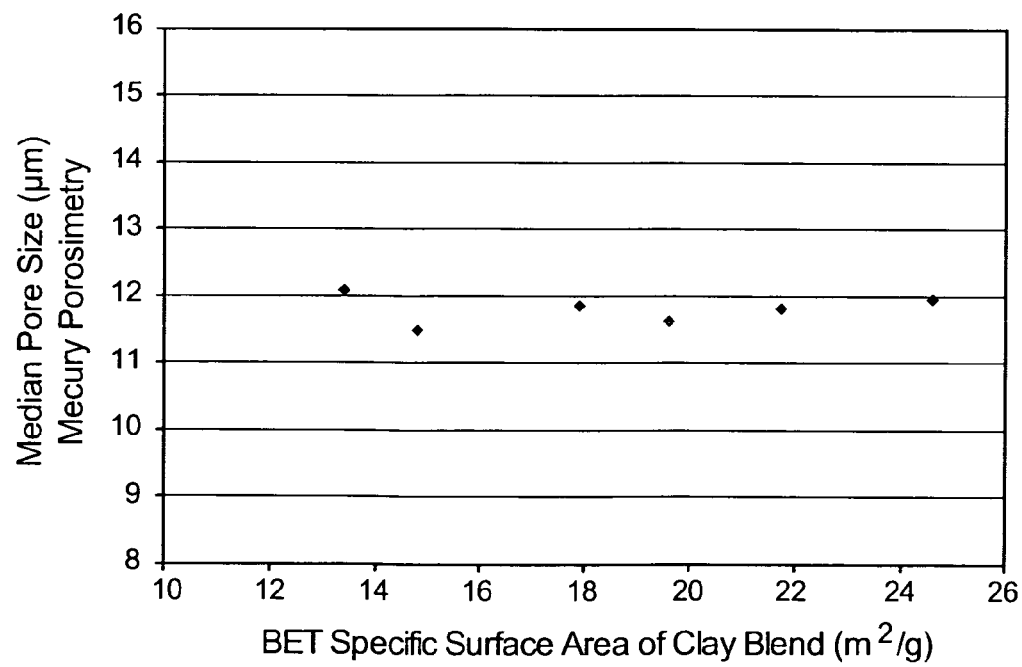
FIG. 6 is a graphical representation of the median pore size of the cordierite-containing ceramic bodies described in Examples 8-13 as a function of the measured specific surface area of the kaolin clay blends used to make the bodies.

The cordierite-containing ceramic body was tested for coefficient of thermal expansion (CTE) (dilatometry) and porosity by mercury intrusion. The results are shown in Table 4 below, and FIGS. 4-6 represent the CTE, total intrusion volume, and pore size as functions of the BET specific surface area of the raw kaolin clay, respectively.

Examples 9-13

Examples 9-13 followed the procedure of Example 8 with the exception of the composition of the raw kaolin clay. Instead, blends of Fine No. 1 and No. 2 kaolin clays, as described in Example 1, were used, with the blends made at 20% increments as set forth in Table 4 below.

All samples were analyzed as described in Example 8. The results are shown in Table 4 below and in FIGS. 4-6.

TABLE 4

CTE, Porosity, and Pore Size of Extruded and Fired Articles

| Example | 8 | 9 | 10 | 11 | 12 | 13 |
|---|---|---|---|---|---|---|
| Wt % No. 2 Kaolin Clay | 100 | 80 | 60 | 40 | 20 | 0 |

TABLE 4-continued

CTE, Porosity, and Pore Size of Extruded and Fired Articles

| Example | 8 | 9 | 10 | 11 | 12 | 13 |
|---|---|---|---|---|---|---|
| Wt % Fine No. 1 Kaolin Clay | 0 | 20 | 40 | 60 | 80 | 100 |
| BET Specific Surface Area (m²/g) | 13.4 | 14.8 | 17.9 | 19.6 | 21.7 | 24.6 |
| CTE (in/in/° C. × 10 exp-7, RT-800° C.) | 3.78 | 3.86 | 3.72 | 3.28 | 3.12 | 2.93 |
| Total Intrusion volume (cc/g) | 0.385 | 0.384 | 0.384 | 0.377 | 0.370 | 0.373 |
| Median Pore Size (μm) | 12.09 | 11.49 | 11.87 | 11.63 | 11.84 | 11.96 |

What is claimed is:

1. A cordierite-forming batch material comprised of inorganic batch components comprising:
   at least one source of magnesium oxide;
   at least one non-kaolin clay source of alumina;
   at least one non-kaolin clay source of silica chosen from fused silica, sol-gel silica, silicone resin, low-alumina substantially alkali-free zeolite, diatomaceous silica, quartz, cristobalite, other crystalline silica, silicic acid and silicon organometallic compounds; and
   at least one kaolin clay;
   wherein the at least one kaolin clay comprises at least one raw kaolin clay having a BET surface area greater than 22 m²/g; and
   wherein the cordierite-forming batch material has an overall composition comprising, in weight percent on an oxide basis, 5-25% MgO, 35-60 wt % SiO$_2$, and 25-50 wt % Al$_2$O$_3$.

2. The cordierite-forming batch material of claim 1, wherein the at least one kaolin clay comprises less than 30 wt % of the inorganic batch components.

3. The cordierite-forming batch material of claim 2, wherein the at least one kaolin clay comprises less than 20 wt % of the inorganic batch components.

4. The cordierite-forming batch material of claim 1, wherein the at least one source of magnesium oxide has a median particle diameter greater than 1 μm.

5. The cordierite-forming batch material of claim 4, wherein the at least one source of magnesium oxide has a median particle diameter ranging from 1 μm to 40 μm.

6. The cordierite-forming batch material of claim 4, wherein the at least one source of magnesium oxide has a median particle diameter greater than 5 μm.

7. The cordierite-forming batch material of claim 6, wherein the at least one source of magnesium oxide has a median particle diameter greater than 10 μm.

8. The cordierite-forming batch material of claim 1, wherein the at least one source of silica has a median particle diameter greater than 3 μm.

9. The cordierite-forming batch material of claim 8, wherein the at least one source of silica has a median particle diameter ranging from 3 μm to 40 μm.

10. The cordierite-forming batch material of claim 8, wherein the at least one source of silica has a median particle diameter greater than 6 μm.

11. The cordierite-forming batch material of claim 1, wherein the cordierite-forming batch material has an overall composition effective to yield upon firing a cordierite-containing ceramic body, wherein the cordierite phase comprises at least 90% by weight of the ceramic body.

12. A method of making a cordierite-containing ceramic body comprising:
   forming a green body from a batch material comprising inorganic batch components comprising:
   at least one source of magnesium oxide;
   at least one non-kaolin clay source of alumina;
   at least one non-kaolin clay source of silica chosen from fused silica, sol-gel silica, silicone resin, low-alumina substantially alkali-free zeolite, diatomaceous silica, quartz, cristobalite, other crystalline silica, silicic acid and silicon organometallic compounds; and
   at least one kaolin clay;
   wherein the at least one kaolin clay comprises at least one raw kaolin clay having a BET surface area greater than 22 m²/g; and
   wherein the cordierite-forming batch material has an overall composition comprising, in weight percent on an oxide basis, 5-25% MgO, 35-60 wt % SiO$_2$, and 25-50 wt % Al$_2$O$_3$; and
   firing the green body to obtain the cordierite-containing ceramic body.

13. The method of making a cordierite-containing ceramic body of claim 12, wherein the at least one kaolin clay comprises less than 30 wt % of the inorganic batch components.

14. The method of making a cordierite-containing ceramic body of claim 12, wherein the at least one source of magnesium oxide has a median particle diameter greater than 1 μm.

15. The method of making a cordierite-containing ceramic body of claim 12, wherein the at least one source of silica has a median particle diameter greater than 3 μm.

16. The method of making a cordierite-containing ceramic body of claim 12, wherein the cordierite-forming batch material has an overall composition effective to yield upon firing a cordierite-containing ceramic body, wherein the cordierite phase comprises at least 90% by weight of the ceramic body.

17. A cordierite-forming batch material comprised of inorganic batch components comprising:
   at least one source of magnesium oxide having a median particle diameter greater than 10 μm;
   at least one non-kaolin clay source of alumina;
   at least one non-kaolin clay source of silica having a median particle diameter greater than 10 μm; and
   at least one kaolin clay;
   wherein the at least one kaolin clay comprises at least one raw kaolin clay having a BET surface area greater than or equal to 14.8 m²/g; and
   wherein the cordierite-forming batch material has an overall composition comprising, in weight percent on an oxide basis, 5-25% MgO, 35-60 wt % SiO2, and 25-50 wt % Al2O3.

18. The cordierite-forming batch material of claim 17, wherein the at least one kaolin clay comprises less than 30 wt % of the inorganic batch components.

19. The cordierite-forming batch material of claim 18, wherein the at least one kaolin clay comprises less than 20 wt % of the inorganic batch components.

20. A method of making a cordierite-containing ceramic body comprising:
   forming a green body from a batch material comprising inorganic batch components comprising:
   at least one source of magnesium oxide having a median particle diameter greater than 10 μm;
   at least one non-kaolin clay source of alumina;
   at least one non-kaolin clay source of silica having a median particle diameter greater than 10 μm; and
   at least one kaolin clay;
   wherein the at least one kaolin clay comprises at least one raw kaolin clay having a BET surface area greater than or equal to 14.8 m²/g; and wherein the cordierite-forming batch material has an overall composition comprising, in weight percent on an oxide basis, 5-25% MgO, 35-60 wt % $SiO_2$, and 25-50 wt % $Al_2O_3$; and firing the green body to obtain the cordierite-containing ceramic body.

21. The method of making a cordierite-containing ceramic body of claim 20, wherein the at least one kaolin clay comprises less than 30 wt % of the inorganic batch components.

22. The method of making a cordierite-containing ceramic body of claim 20, wherein the cordierite-forming batch material has an overall composition effective to yield upon firing a cordierite-containing ceramic body, wherein the cordierite phase comprises at least 90% by weight of the ceramic body.

* * * * *